US011235536B2

(12) United States Patent
Mori et al.

(10) Patent No.: US 11,235,536 B2
(45) Date of Patent: Feb. 1, 2022

(54) METHOD FOR WELDING SYNTHETIC RESIN MEMBER

(71) Applicants: TOYOTA JIDOSHA KABUSHIKI KAISHA, Toyota (JP); NATIONAL UNIVERSITY CORPORATION NAGOYA UNIVERSITY, Nagoya (JP); TORAY INDUSTRIES, INC., Tokyo (JP); ISHIKAWA PREFECTURE, Kanazawa (JP); MITSUBISHI JIDOSHA KOGYO KABUSHIKI KAISHA, Tokyo (JP); SUZUKI MOTOR CORPORATION, Hamamatsu (JP); TEIJIN LIMITED, Osaka (JP)

(72) Inventors: Takayuki Mori, Chita-gun (JP); Kenichi Hirosaki, Kanazawa (JP); Wataru Okumura, Kanazawa (JP); Daisuke Mori, Kanazawa (JP); Yoshihiro Iwano, Toyota (JP); Kazuaki Amaoka, Nagoya (JP)

(73) Assignees: TOYOTA JIDOSHA KABUSHIKI KAISHA, Toyota (JP); NATIONAL UNIVERSITY CORPORATION NAGOYA UNIVERSITY, Nagoya (JP); ISHIKAWA PREFECTURE, Kanazawa (JP); TORAY INDUSTRIES, INC., Tokyo (JP); MITSUBISHI JIDOSHA KOGYO KABUSHIKI KAISHA, Tokyo (JP); SUZUKI MOTOR CORPORATION, Hamamatsu (JP); TEIJIN LIMITED, Osaka (JP)

( * ) Notice: Subject to any disclaimer, the term of this patent is extended or adjusted under 35 U.S.C. 154(b) by 34 days.

(21) Appl. No.: 16/636,551

(22) PCT Filed: Aug. 13, 2018

(86) PCT No.: PCT/JP2018/030194
§ 371 (c)(1),
(2) Date: Feb. 4, 2020

(87) PCT Pub. No.: WO2019/035442
PCT Pub. Date: Feb. 21, 2019

(65) Prior Publication Data
US 2021/0162678 A1 Jun. 3, 2021

(30) Foreign Application Priority Data
Aug. 14, 2017 (JP) .............................. JP2017-156489

(51) Int. Cl.
*B29C 65/16* (2006.01)
*B29K 307/04* (2006.01)

(52) U.S. Cl.
CPC ...... *B29C 65/1648* (2013.01); *B29C 65/1654* (2013.01); *B29K 2307/04* (2013.01)

(58) Field of Classification Search
CPC . B29C 65/16; B29C 65/1648; B29C 65/1654; B29K 2307/04
See application file for complete search history.

(56) References Cited

U.S. PATENT DOCUMENTS 7,767,920 B1 * 8/2010 Matsuhashi ....... B29C 66/53461
200/61.88
2004/0095444 A1 * 5/2004 Drummond ......... B29C 65/1664
347/86
(Continued)

FOREIGN PATENT DOCUMENTS

JP 2002-283457 A 10/2002
JP 2002283457 A * 10/2002 ....... B29C 66/73921
(Continued)

OTHER PUBLICATIONS

Apr. 13, 2021 Search Report issued in European Patent Application No. 18845572.9.

*Primary Examiner* — Daniel McNally
(74) *Attorney, Agent, or Firm* — Oliff PLC

(57) ABSTRACT

A protrusion on a first member made of synthetic resin wherein a laser beam is applied to a side surface of the protrusion in a state in which a top surface of the protrusion of the first member is abutted against a second member made of synthetic resin, so as to melt at least the entire top surface of the protrusion and melt a portion of the second member in contact with the protrusion by heat of the melted top surface of the protrusion, followed by solidification of the
(Continued)

melted portions, whereby the first member and the second member are welded together.

9 Claims, 13 Drawing Sheets

(56) References Cited

U.S. PATENT DOCUMENTS

| | | | |
|---|---|---|---|
| 2005/0218123 | A1 | 10/2005 | Hayakawa et al. |
| 2010/0129647 | A1* | 5/2010 | Bhagavatula ........ G02B 6/2551 428/339 |
| 2012/0267878 | A1* | 10/2012 | Kalisz ..................... B60R 13/02 280/728.2 |
| 2014/0283986 | A1* | 9/2014 | Kunichi ............ B29C 66/91216 156/272.8 |

FOREIGN PATENT DOCUMENTS

| | | |
|---|---|---|
| JP | 2008-302700 A | 12/2008 |
| JP | 2011-255683 A | 12/2011 |
| JP | 2012-091400 A | 5/2012 |
| JP | 2014-180843 A | 9/2014 |

\* cited by examiner

METHOD FOR WELDING SYNTHETIC RESIN MEMBER

TECHNICAL FIELD

The present invention relates to a method for welding synthetic resin members.

BACKGROUND ART

As described in the following Patent Documents 1 to 3, according to known methods for welding synthetic resin members, synthetic resin members (a first member and a second member) are abutted against each other, and abutting portions are irradiated with a laser beam to be melted, followed by solidification.

According to Patent Document 1, a first member having high laser light transmittancy and a second member having high laser light absorbency (low laser light transmittancy) are stacked. A laser beam is applied from a first member side. The laser beam transmitting through the first member melts a surface of the second member (i.e., a surface in contact with the first member). The thus-melted synthetic resin material spreads between the first member and the second member. Subsequently, the synthetic resin material having spread between the first member and the second member cools to solidify. As a result, the first member and the second member are welded together.

According to Patent Document 2, for example, a laser beam is perpendicularly applied to the end surfaces of a cylindrical first member and a cylindrical second member. The melted end surfaces (surfaces) are abutted against each other (see FIG. 6 of Patent Document 2). Subsequently, the melted portions cool to solidify. As a result, the first member and the second member are welded together.

As illustrated in FIGS. 2 and 4 of Patent Document 2, for example, a deep-box-shaped first member that opens upward, and a shallow-box-shaped (cover-shaped) second member that opens downward are welded together. In an example shown in FIG. 4(b) of Patent Document 2, the upper end surface of a side wall portion of the first member is formed stepwise. Specifically, the height of upper surface of the side wall portion of the first member increases stepwise from the outer side toward the inner side in the wall thickness direction of the side wall portion of the first member. Meanwhile, the lower end surface of a side wall portion of the second member is also formed stepwise. The lower end surface of the side wall portion of the second member and the upper end surface of the side wall portion of the first member are in vertical symmetry. The upper end surface of the side wall portion of the first member and the lower end surface of the side wall portion of the second member are abutted against each other. In this condition, a groove that opens toward the outside of the box is formed between the upper end surface of the side wall portion of the first member and the lower end surface of the side wall portion of the second member (FIG. 4(b) of Patent Document 2). A laser beam is applied into the groove to melt the upper end surface of the side wall portion of the first member and the lower end surface of the side wall portion of the second member. The second member is pressed toward the first member; as a result, the melted synthetic resin material spreads within the groove. The synthetic resin material spread within the groove cools to solidify. As a result, the first member and the second member are welded together.

According to Patent Document 3, a plate-shaped joining material made of synthetic resin and having high laser light absorbency is held between a first member and a second member. A laser beam is applied to an end surface of the joining material, whereby the joining material is melted. The melted joining material spreads between the first member and the second member. Subsequently, the joining material having spread between the first member and the second member cools to solidify. As a result, the first member and the second member are welded together.

PRIOR ART DOCUMENTS

Patent Documents

Patent Document 1: Japanese Patent Application Laid-Open (kokai) No. 2008-302700
Patent Document 2: Japanese Patent Application Laid-Open (kokai) No. 2012-091400
Patent Document 3: Japanese Patent Application Laid-Open (kokai) No. 2014-180843

SUMMARY OF THE INVENTION

The method of Patent Document 1 is supposed to employ a member having high laser light transmittancy as the first member. Accordingly, the method of Patent Document 1 fails to join together members each having high laser light absorbency.

According to the example of FIG. 4(b) of Patent Document 2, when a laser beam is applied into the groove, surfaces (receiving surfaces 1$f$ and 3$f$) perpendicular to the optical axis of the laser beam mainly melt within the groove. In this example, only the inner surfaces (surfaces) of the groove melt, and the shape of steps remains within the groove. Accordingly, when the second member is pressed toward the first member, unmelted portions (remaining step-shaped portions) within the groove abut against one another. As a result, difficulty is encountered in spreading the melted synthetic resin material within the groove for filling the groove with the melted synthetic resin material. Therefore, difficulty is encountered in increasing the welding strength between the first member and the second member.

The method of Patent Document 3 requires a joining material. Accordingly, the number of members increases as compared with the methods of Patent Document 1 and Patent Document 2. Also, the welding strength between the first member and the second member is influenced by properties of the joining material. Specifically, when the mechanical strength (e.g., shear strength) of the joining material is low, the welding strength between the first member and the second member and the rigidity of a component formed by welding the first member and the second member together deteriorate.

The present invention has been conceived to cope with the above problems, and an object of the invention is to provide a synthetic resin member welding method that can weld together synthetic resin members each having high laser light absorbency and can set the welding strength to be high. In the following description of the constituent elements of the invention, in order to facilitate understanding of the present invention, the constituent elements of the invention corresponding to those of an embodiment of the invention are accompanied by parenthesized symbols which are used in the embodiment; however, the constituent elements of the invention should not be construed as being limited to those in the embodiment denoted by the symbols.

In order to achieve the above object, the present invention provides a synthetic resin member welding method for welding together a first member (10, 100) made of synthetic resin and a second member (20, 200) made of synthetic resin. A feature of the synthetic resin member welding method resides in that a protrusion (12, 121, 122) is provided on the first member, and a laser beam is applied to a side surface of the protrusion in a state in which a top surface of the protrusion of the first member is abutted against the second member, so as to melt at least the entire top surface of the protrusion and melt a portion of the second member, which portion is in contact with the top surface, followed by solidification of the melted portions, whereby the first member and the second member are welded together.

In this case, preferably, the protrusion extends in a predetermined direction, and a laser beam is applied to a side surface of the protrusion and is scanned in the predetermined direction for melting at least the entire top surface of the protrusion and melting the portion of the second member in contact with the top surface by heat of the melted top surface, followed by solidification of the melted portions, whereby the first member and the second member are welded together.

In the present invention, a protrusion is provided on the first member, and the top surface of the protrusion is abutted against the second member. The protrusion forms a gap between the first member and the second member. The laser beam is applied to a side surface of the protrusion through the gap so as to melt the protrusion. In this manner, in contrast to the method of Patent Document 1, according to the present invention, the laser beam is not required to penetrate through the first member or the second member. Therefore, even in the case of the first member and the second member each having high laser light absorbency, the members can be welded together.

Also, the laser beam is applied to a side surface of the protrusion so as to melt the entire top surface of the protrusion; further, heat of the melted top surface is transmitted to a portion of the second member in contact with the protrusion so as to melt a surface of the second member. In this manner, by melting the entire region in which the first member and the second member are in contact with each other, the welding strength between the first member and the second member can be increased. Further, by applying the laser beam to the protrusion in a state in which an external force is applied so as to urge the first member and the second member closer to each other, the melted synthetic resin material of the first member and the melted synthetic resin material of the second member can be mixed and spread between the first member and the second member. Therefore, the welding strength between the first member and the second member can be further enhanced.

Also, since there is no need to use a joining material as in Patent Document 3, the number of members can be reduced as compared with the method of Patent Document 3. Also, the welding strength between the first member and the second member and the rigidity of a component formed by welding the first member and the second member together are not influenced by the mechanical strength of another member such as the joining material.

Another feature of the synthetic resin member welding method of the present invention resides in that a portion of a spot of the laser beam is positioned on a boundary between the first member and the second member.

According to this feature, the laser beam directly melts a side surface of the protrusion and the surface of the second member. Heat of the melted surfaces is transmitted to the top surface of the protrusion and to the surface of the second member in contact with the protrusion to thereby melt the top surface and the contact surface. Therefore, as compared with a case in which the laser beam is applied to only a side surface of the protrusion, and heat is transmitted only from the side surface of the protrusion to the top surface of the protrusion and to the contact surface, the top surface of the protrusion and the contact surface can be melted reliably and speedily.

A further feature of the synthetic resin member welding method of the present invention resides in that laser beams are individually applied to opposite side surfaces of the protrusion and are scanned in the predetermined direction for melting at least the entire top surface of the protrusion and melting the portion of the second member in contact with the top surface by heat of the melted top surface, followed by solidification of the melted portions, whereby the first member and the second member are welded together.

According to this feature, as compared with the case where the laser beam is applied to only one side surface of the protrusion, the protrusion can be melted reliably and speedily.

A still further feature of the synthetic resin member welding method of the present invention resides in that a groove (G) extending along the protrusion is formed on the second member, so that at least a portion of melted synthetic resin material flows into the groove.

According to this feature, when the protrusion melts as a result of irradiation with the laser beam, a portion of the melted synthetic resin material flows into the groove. By virtue of this, the melted synthetic resin material can be restrained from oozing outward from the first member and the second member.

A yet another feature of the synthetic resin member welding method of the present invention resides in that the protrusion extends zigzag in relation to a predetermined rectilinear direction, and the laser beam is scanned along the predetermined rectilinear direction.

According to this feature, as compared with the case where the protrusion extends rectilinearly in the predetermined rectilinear direction, the joining area per unit distance in the predetermined rectilinear direction increases. Therefore, the welding strength between the first member and the second member can be further enhanced.

Another feature of the synthetic resin member welding method of the present invention resides in that a projecting portion (ST) extending in an extending direction of the protrusion is provided on the first member or the second member such that the projecting portion projects from a surface of the first member or the second member and the projecting portion is lower in protruding height than the protrusion, and of the protrusion and the projecting portion, only the protrusion is melted, whereas the projecting portion is not melted.

According to this feature, when the protrusion melts to spread between the first member and the second member with a resultant reduction in distance between the first member and the second member, the first member or the second member comes into contact with the projecting portion, thereby restraining further reduction in the distance. That is, according to the present invention, the size of the gap between the first member and the second member after welding can be fixed.

A further feature of the synthetic resin member welding method of the present invention resides in that a distal end portion of the protrusion is smaller in width than a proximal end portion of the protrusion. The distal end portion of the protrusion is an end portion of the protrusion on the top surface side. The proximal end portion of the protrusion is an end portion opposite the distal end portion with respect to the protruding direction of the protrusion. By virtue of this, the distal end side of the protrusion can be preferentially melted.

A still further feature of the synthetic resin member welding method of the present invention resides in that the first member and the second member are formed of the same synthetic resin material. In the case where a synthetic resin material used to form the first member and a synthetic resin material used to form the second member differ from each other, the difference in material may cause one of the first member and the second member to be lower in mechanical strength than the other. In this case, the welding strength between the two members may be affected by the mechanical strength of the one. According to the present invention, since the first member and the second member are formed of the same synthetic resin material, the two members have the same mechanical strength. Therefore, high welding strength can be maintained.

A still further feature of the synthetic resin member welding method of the present invention resides in that the first member and the second member are formed of a carbon fiber reinforced plastic that contains carbon fibers, and the protrusion is formed integrally with a body of the first member. Preferably, injection molding, press molding, extrusion molding, or the like is used to integrally form the protrusion with the body of the first member. By virtue of this, when the protrusion and a counter portion of the second member melt, carbon fibers contained in the protrusion and carbon fibers contained in the second member are easily intertangled. As a result, the welding strength can be further enhanced.

MODES FOR CARRYING OUT THE INVENTION

Figure 1:
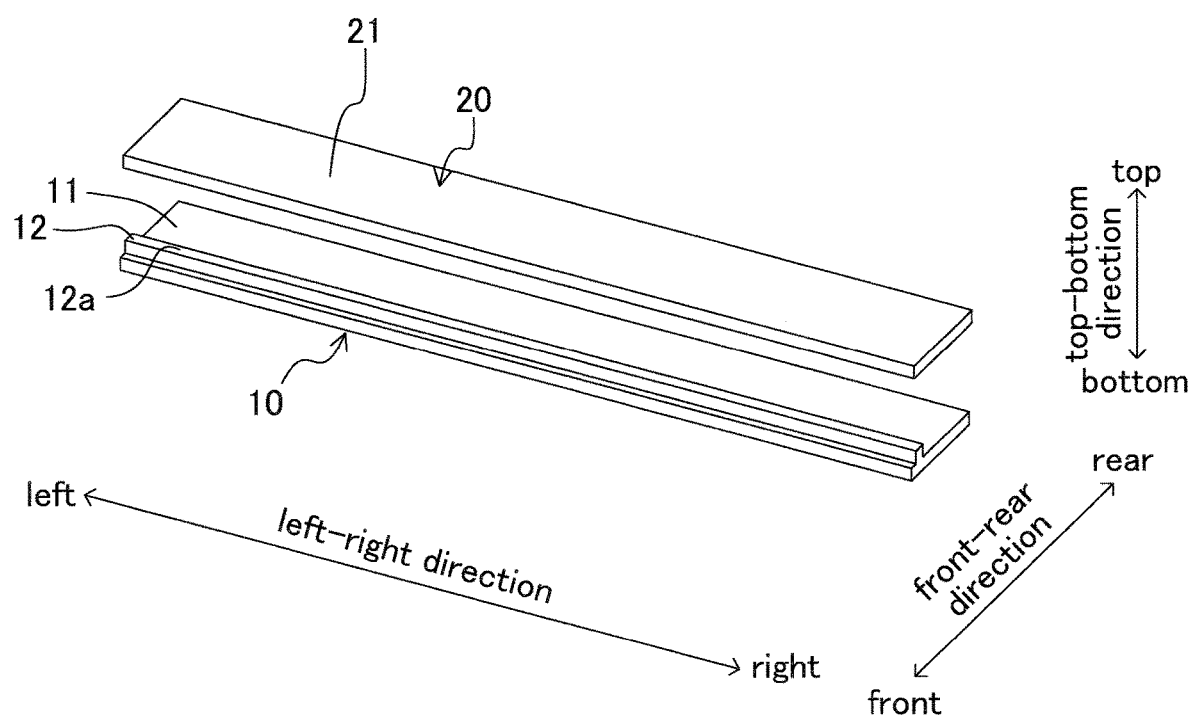
FIG. 1 Perspective view of a first member and a second member.

A synthetic resin member welding method according to an embodiment of the present invention will next be described. The present embodiment will be described while referring to an example of a method for forming an approximately plate-shaped component by welding together a first member 10 and a second member 20 each approximately having a plate shape as shown in FIG. 1. First, the structures of the first member 10 and the second member 20 will be described.

The first member 10 and the second member 20 are made of synthetic resin. Specifically, the first member 10 and the second member 20 are made of a carbon fiber reinforced plastic (CFRP). The first member 10 and the second member 20 have high laser light absorbency. That is, a laser beam hardly penetrates through the first member 10 and the second member 20. Also, the first member 10 and the second member 20 have high thermal conductivity. For example, when the first member 10 and the second member 20 contain carbon fibers in an amount of 40 weight %, the first member 10 and the second member 20 have a thermal conductivity of 2 W/(m·K). The first member 10 and the second member 20 each have a rectangular plate shape. In the following description, the plate thickness direction of the first member 10 and the second member 20 is called the top-bottom direction. The longitudinal direction of the first member 10 and the second member 20 is called the left-right direction. The width direction of the first member 10 and the second member 20 (a direction perpendicular to the plate thickness direction and to the longitudinal direction) is called the front-rear direction.

The first member 10 has a body 11 formed into the shape of a rectangular flat plate, and a protrusion 12 formed on the upper surface of the body 11. The body 11 and the protrusion 12 are formed integrally by injection molding. The protrusion 12 extends in the left-right direction on the upper surface of the body 11. The protrusion 12 is located slightly rearward of the front end of the body 11. The protrusion 12 extends between the right end and the left end of the body 11. In a section of the first member 10 taken perpendicularly to the longitudinal direction (left-right direction), the protrusion 12 has a rectangular shape. A top surface 12a of the protrusion 12 is a plane perpendicular to the top-bottom direction. The first member 10 has a dimension in the left-right direction (length) of, for example, 160 mm. The first member 10 has a dimension in the front-rear direction (width) of, for example, 25 mm. The first member 10 has a dimension in the top-bottom direction (thickness) of, for example, 3 mm. The protrusion 12 has a dimension in the front-rear direction of, for example, 2 mm. The protruding height of the protrusion 12 is, for example, 1.5 mm from the upper surface of the body 11. Since the first member 10 has relatively high thermal conductivity as mentioned above, when a laser beam is applied to a side surface of the protrusion 12, heat is easily transmitted to the top surface 12a of the protrusion 12 from the spot position of the laser beam on the side surface. By setting the dimension in the front-rear direction (width) of the protrusion 12 to 0.5 mm to 1.0 mm, a portion of the top surface 12a in the vicinity of the spot position of the laser beam can be entirely melted with ease.

The second member 20 is formed of a body 21 in the shape of a rectangular flat plate and does not have a protrusion in contrast to the first member 10. The second member 20 has external dimensions approximately the same as those of the first member 10.

The first member 10 is placed on an unillustrated base, and the second member 20 is placed on the first member 10. The top surface of the protrusion 12 is abutted against the lower surface of the body 21. Notably, the body 11 and the body 21 are in parallel with each other.

Figure 2:
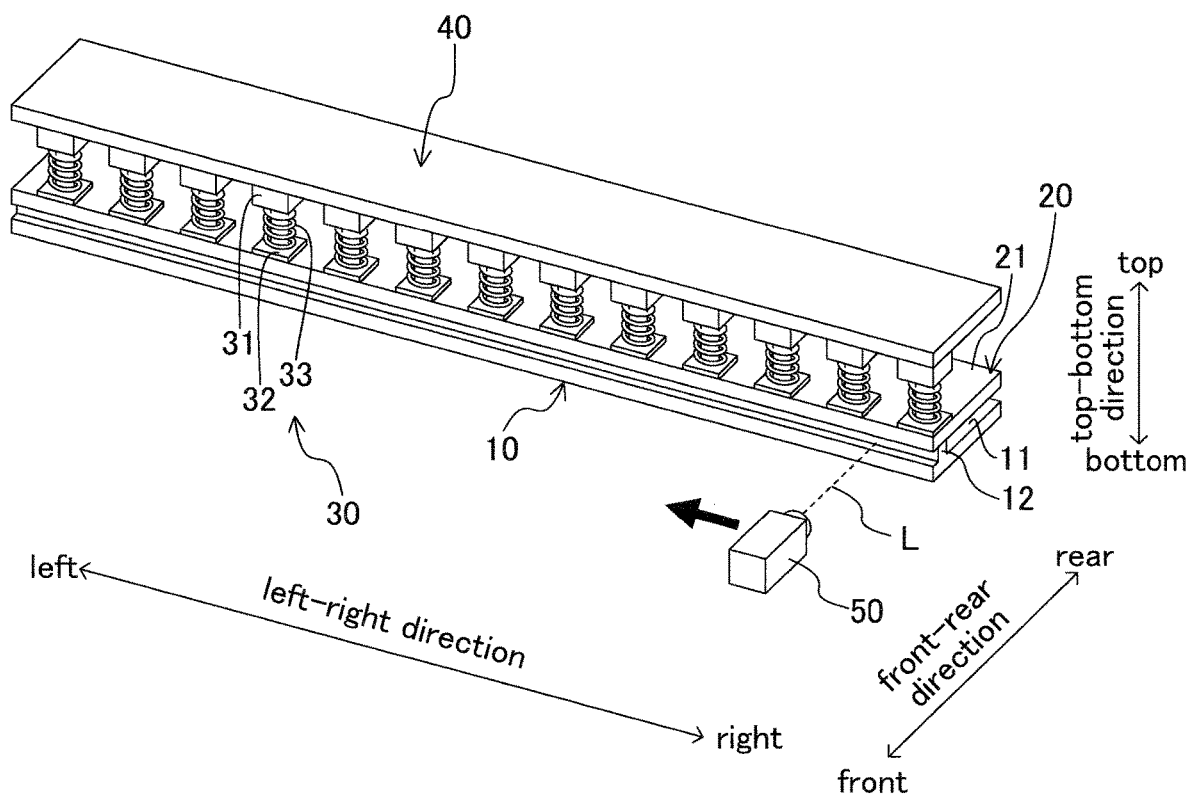
FIG. 2 Perspective view showing a step of welding the first member and the second member together.

Next, as shown in FIG. 2, a front end portion (a portion located above the protrusion 12) of the upper surface of the body 21 is pressed downward by a plurality of pressing devices 30. Each pressing device 30 has a base 31, a pressing pin 32, and a spring 33. The base 31 supports the pressing pin 32. The pressing pin 32 can move in the top-bottom direction in relation to the base 31. The spring 33 is disposed between the base 31 and the pressing pin 32 and urges the pressing pin 32. The pressing devices 30 are attached to the lower surface of a support plate 40 extending in the left-right direction. A plurality of the pressing devices 30 are juxtaposed in the left-right direction. The distal end of each pressing pin 32 is formed into a flat-plate shape perpendicular to the top-bottom direction. The upper surfaces of the bases 31 are fixed to the lower surface of the support plate 40 such that the distal ends of the pressing pins 32 face downward. In a state in which the distal ends of the pressing pins 32 are abutted against the upper surface of the body 21, the bases 31 are pressed downward by the support plate 40. As a result, the springs 33 are elastically deformed, and their elastic forces (spring loads) are applied to the upper surface of the body 31, whereby the body 21 is pressed downward. Notably, for example, the position of the support plate 40 in the top-bottom direction is determined such that each spring 33 applies a spring load of 15N.

Next, a laser beam L is emitted from a laser apparatus 50 and applied to a side surface (front surface) of the protrusion 12. The laser apparatus 50 includes a laser light source, an optical fiber for transmitting a laser beam emitted from the laser source, and an emitter including one or a plurality of convex lenses that focus the laser beam emitted from the optical fiber into the laser beam L for outward emission. The laser beam L emitted from the laser apparatus 50 has a wavelength of, for example, 974 nm. The spot diameter of the laser beam L is, for example, 0.5 mm. The focal distance of the laser beam L is, for example, 100 mm. Intensity (output) of the laser beam L is, for example, 30 W.

The emitter of the laser apparatus 50 is disposed in such a manner as to face a side surface (front surface) of the protrusion 12. The distance between the emission aperture of the emitter of the laser apparatus 50 and the side surface (front surface) of the protrusion 12 is equal to the focal distance of the laser beam L. The position of the emitter of the laser apparatus 50 is determined such that the spot of the laser beam L is positioned at a central portion of the side surface of the protrusion 12 in the top-bottom direction. The emitter of the laser apparatus 50 is attached to an unillustrated robot hand. The robot hand moves the emitter of the laser apparatus 50 in the left-right direction for scanning the laser beam L in the left-right direction. The scanning speed of the laser beam L is, for example, 2 mm/sec.

When the laser beam L is applied to the side surface (front surface) of the protrusion 12, a portion (spot position) irradiated with the laser beam L increases in temperature and begins to melt. Heat is transmitted within the protrusion 12 radially from the spot position; as a result, a portion of the protrusion 12 located above, below, and rearward of the spot position melts. The area of the melted portion reaches the upper end, the lower end, and the rear surface of the protrusion 12. Specifically, as a result of transmission of heat to a portion of the protrusion 12 including the spot position and its vicinity, in addition to the side surface (front surface) of the protrusion 12, a portion of the top surface 12a in the vicinity of the spot position melts entirely. Since the top surface 12a of the protrusion 12 is abutted against the lower surface of the second member 20, the heat of the top surface 12a of the protrusion 12 is transmitted to the second member 20; as a result, a portion of the lower surface of the second member 20, which portion is in contact with the melted portion of the top surface 12a of the protrusion 12, melts. Particularly, in the present embodiment, since the first member 10 and the second member 20 are made of a carbon fiber reinforced plastic and thus have relatively high thermal conductivity, the heat of the protrusion 12 relatively easily melts the second member 20. A plurality of the pressing devices 30 for pressing the second member 20 downward are juxtaposed in the left-right direction on a front portion (above the protrusion 12) of the second member 20. The pressing device 30 located above the melted portion of the protrusion 12 crush the melted portion; as a result, the melted synthetic resin of the first member 10 and the melted synthetic resin of the second member 20 are mixed and spread between the first member 10 and the second member 20. Subsequently, the synthetic resin having spread between the first member 10 and the second member 20 cools to solidify, thereby welding the first member 10 and the second member 20 together. For example, when the laser beam L is scanned from the right end toward the left end of the protrusion 12, the protrusion 12 melts sequentially from its right end toward its left end, and the protrusion 12 is crushed sequentially from its right end toward its left end. In this manner, the first member 10 and the second member 20 are welded together sequentially from their right ends toward their left ends.

In the present embodiment, the protrusion 12 is provided on the first member 10, and the top surface 12a of the protrusion 12 is abutted against the lower surface of the plate-shaped second member 20. The protrusion 12 forms a gap between the first member 10 and the second member 20. The laser beam L is applied through the gap to a side surface of the protrusion 12, whereby the protrusion 12 is melted. In this manner, in the present embodiment, the laser beam L does not need to penetrate through the first member 10 or the second member 20 in contrast to the method of Patent Document 1. Therefore, even though the first member 10 and the second member 20 have high laser light absorbency as in the case of the present embodiment, the two members can be welded together.

Also, the laser beam L is applied to a side surface of the protrusion 12 to thereby melt entirely a portion of the top surface 12a of the protrusion 12 in the vicinity of the spot position; further, the heat of the melted portion is transmitted to a portion of the second member 20, which portion is in contact with the protrusion 12, to thereby melt a surface of the second member 20. In this manner, by melting the entire region in which the first member 10 and the second member 20 are in contact with each other, the welding strength between the first member 10 and the second member 20 can be increased. Further, the laser beam L is applied to the protrusion 12 in a state in which, by use of the pressing devices 30, an external force is applied so as to urge the first member 10 and the second member 20 closer to each other. By virtue of this, the melted synthetic resin material of the first member 10 and the melted synthetic resin material of the second member 20 can be mixed and spread between the first member 10 and the second member 20. Therefore, as compared with the method of Patent Document 2, the welding strength between the first member 10 and the second member 20 can be increased. Also, when the protrusion 12 and a counter portion of the second member 20 melt, carbon fibers contained in the protrusion 12 and carbon fibers contained in the second member 20 are easily intertangled. As a result, the welding strength can be further enhanced. For example, the welding strength (shear strength (yield strength against an external force attempting to shift the first member 10 and the second member relative to each other in the front-rear direction)) of a welded portion is about 20 MPa, which is equivalent to that in the case of use of a hot-plate welding method.

Also, since there is no need to use a joining material as in Patent Document 3, the number of members can be reduced as compared with the method of Patent Document 3. Also, the welding strength between the first member 10 and the second member 20 and the rigidity of a component formed by welding the first member 10 and the second member 20 together are not influenced by the mechanical strength of another member such as the joining material. In the case where the synthetic resin material used to form the first member 10 and the synthetic resin material used to form the second member 20 differ from each other, the difference in material may cause one of the first member 10 and the second member 20 to be lower in mechanical strength than the other. In this case, the welding strength between the two members may be affected by the mechanical strength of the one. According to the present embodiment, since the first member 10 and the second member 20 are formed of the same synthetic resin material, the two members have the same mechanical strength. Therefore, high welding strength can be maintained.

Further, in embodying the present invention, the present invention is not limited to the above embodiment, but may be modified in various forms without departing from the object of the present invention.

Figure 3:
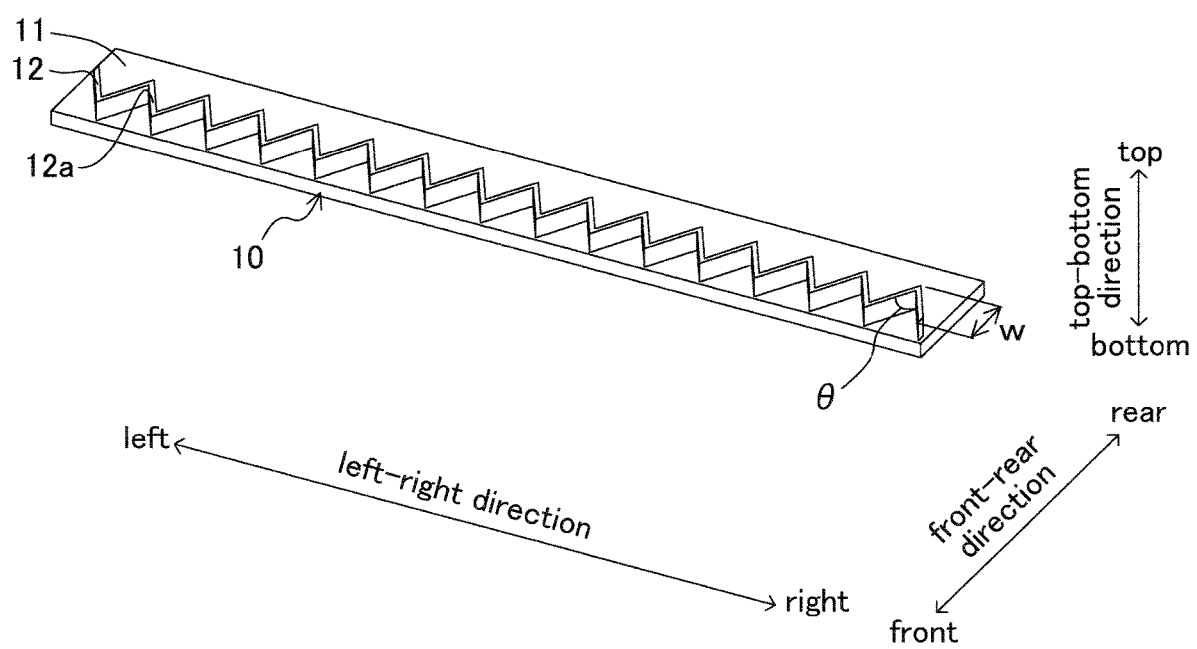
FIG. 3 Perspective view of a first member having a protrusion extending zigzag in relation to a predetermined rectilinear direction.

For example, in the above embodiment, the protrusion 12 extends rectilinearly in the left-right direction. Instead, as shown in FIG. 3, the protrusion 12 may extend zigzag. Specifically, in extension from one end toward the other end of a predetermined rectilinear line (e.g., the front side of the first member 10), the distance from the predetermined rectilinear line to the protrusion 12 may cyclically vary. In the example shown in FIG. 3, the protrusion 12 has a triangular wave shape. In this example, the protrusion 12 has a zigzag width w of, for example, 25 mm. Its vertex angle θ is, for example, 60°. According to this example, a joining area per unit length in the left-right direction is greater than that of the example of FIG. 1. Therefore, the welding strength between the first member 10 and the second member 20 can be further enhanced. In this case, preferably, the laser beam L is converted to parallel light by use of an optical system composed of one or a plurality of lenses. In this case, the emitter of the laser apparatus 50 may be scanned merely in the left-right direction and does not need to be scanned in the front-rear direction. Also, even when the laser beam L is not complete parallel light; more specifically, even when the laser beam L has such a relatively long focal distance as to be considered parallel light, the emitter of the laser apparatus 50 is only required to be moved in the left-right direction and does not need to be moved in the front-rear direction. In this case, control of movement of the emitter of the laser apparatus 50 (control of a robot hand) is simple. However, although control of the robot hand becomes somewhat complicated, in scanning the laser beam L, in order that the distance between the protrusion 12 and the laser beam L emission aperture coincides with the focal distance all the time, the emitter of the laser apparatus 50 may be moved in the left-right direction as well as the front-rear direction.

In the above embodiment, the laser beam L is applied to one side surface (front surface) of the protrusion 12. Instead, the laser beam L may be applied to opposite side surfaces (front surface and rear surface) of the protrusion 12.

Figure 4:
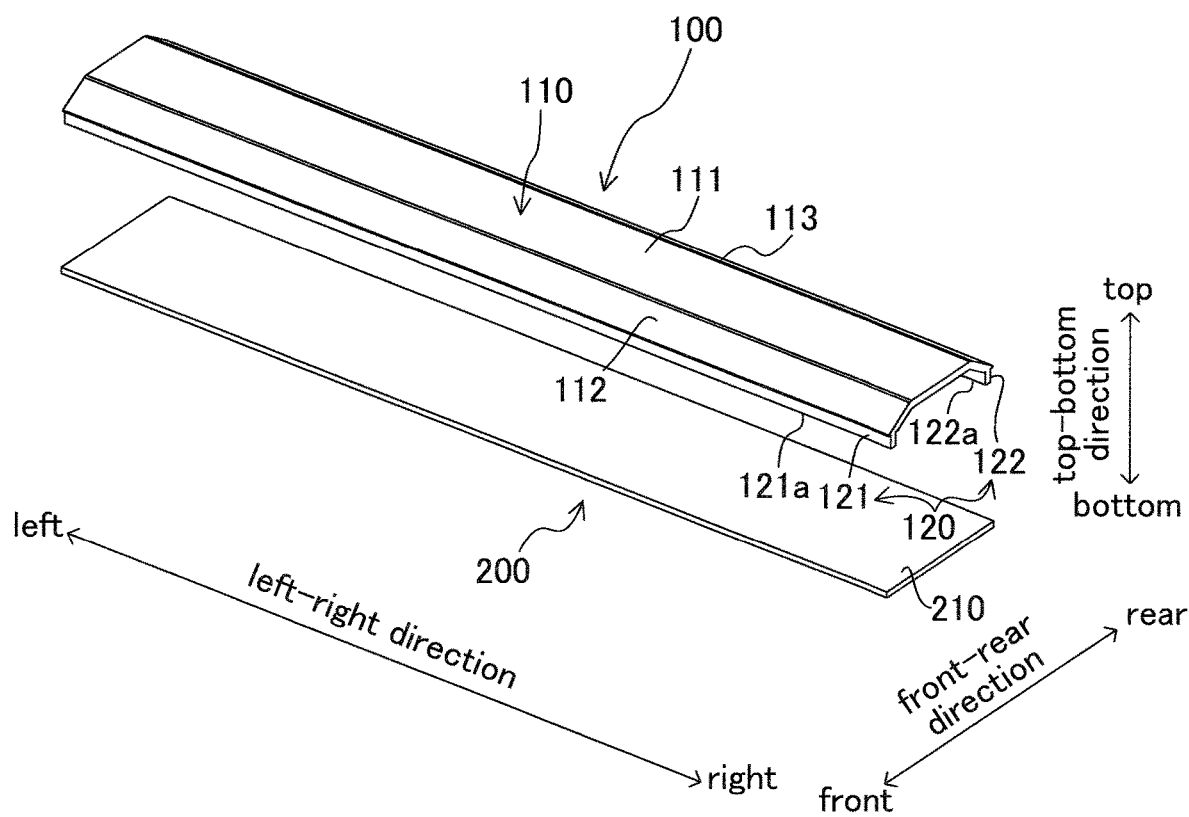
FIG. 4 Perspective view of a first member and a second member used to form a tubular member.

In the above embodiment, an approximately plate-shaped component is formed by welding together the approximately plate-shaped first member 10 and the second member 20. However, the present invention can be applied to formation of a component having another shape. For example, as shown in FIG. 4, a tubular component is formed by welding a first member 100 and a second member 200 together. In this example also, the first member 100 and the second member 200 are made of a carbon fiber reinforced plastic. The first member 100 has a body 110 and a protrusion 120. The body 110 includes a top plate portion 111, a front slope portion 112 extending obliquely frontward and downward from the front end of the top plate portion 111, and a rear slope portion 113 extending obliquely rearward and downward from the rear end of the top plate portion 111. The protrusion 120 is composed of two (i.e., front and rear) protrusions 121 and 122. The protrusion 121 extends downward from the front end of the front slope portion 112. The protrusion 122 extends downward from the rear end of the rear slope portion 113. Top surfaces (lower surfaces) 121a and 122a of the protrusions 121 and 122, respectively, are planes perpendicular to the top-bottom direction. The second member 200 has a plate-shaped body 210.

Figure 5:
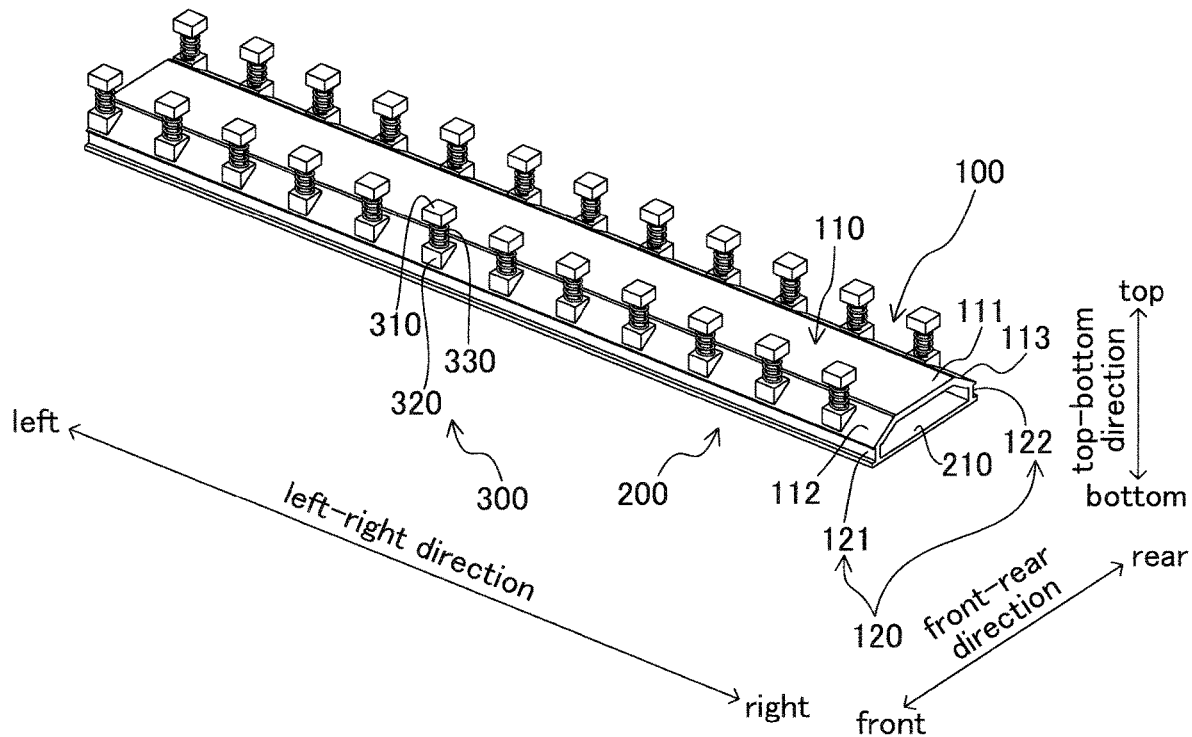
FIG. 5 Perspective view showing a step of welding together the first member and the second member of FIG. 4.

As shown in FIG. 5, the first member 100 is placed on the second member 200, and the top surfaces 121a and 122a of the protrusions 121 and 122 are abutted against the upper surface of the second member 200. The upper surface of a front end portion of the first member 100 and the upper surface of a rear end portion of the first member 100 are pressed downward by a plurality of pressing devices 300. The structure of the pressing device 300 is approximately the same as that of the pressing device 30. Specifically, the pressing device 300 has a base 310, a pressing pin 320, and a spring 330. The structures of the base 310 and the spring 330 are the same as those of the base 31 and the spring 33, respectively, of the pressing device 30. The structure of the pressing pin 320 slightly differs from that of the pressing pin 32 of the pressing device 30. Specifically, in contrast to the lower surface of the pressing pin 32 of the pressing device 30 of the above embodiment which has a plate shape perpendicular to the top-bottom direction, the lower surface of the pressing pin 320 is formed obliquely so as to extend along the upper surface of the front slope portion 112 or the upper surface of the rear slope portion 113. Similarly to the above embodiment, the pressing devices 300 are supported by a support plate 400. Notably, in FIG. 5, the support plate 400 is omitted.

Figure 6A:
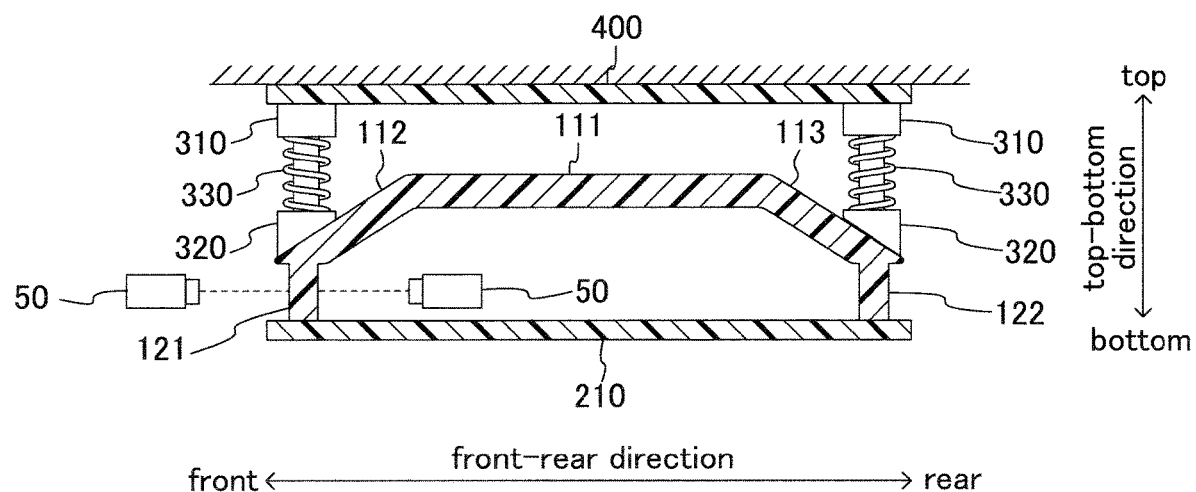
FIG. 6A Sectional view of the first member and the second member of FIG. 4 taken perpendicularly to the longitudinal direction thereof and showing a step of welding front end portions together.
Figure 6B:
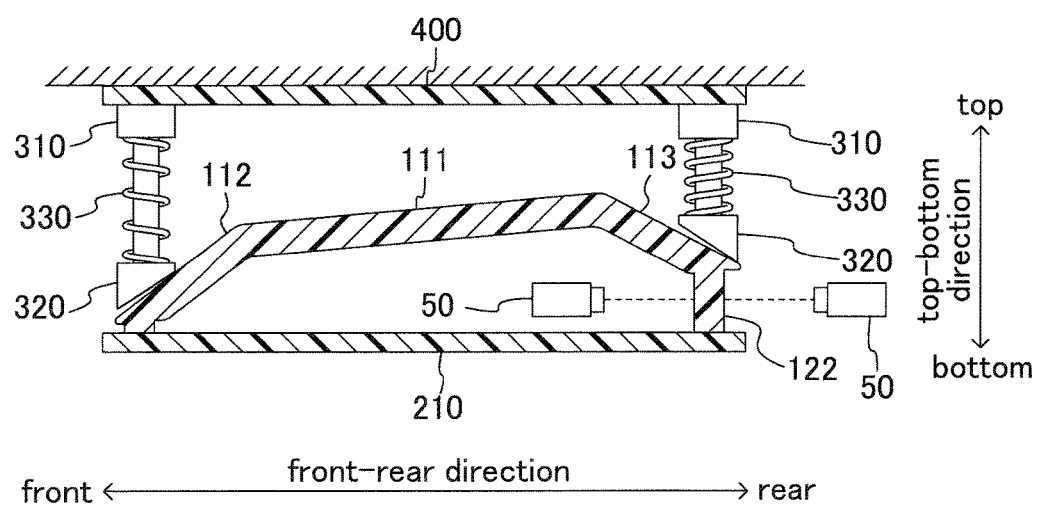
FIG. 6B Sectional view of the first member and the second member of FIG. 4 taken perpendicularly to the longitudinal direction and showing a step of welding rear end portions together.
Figure 6C:
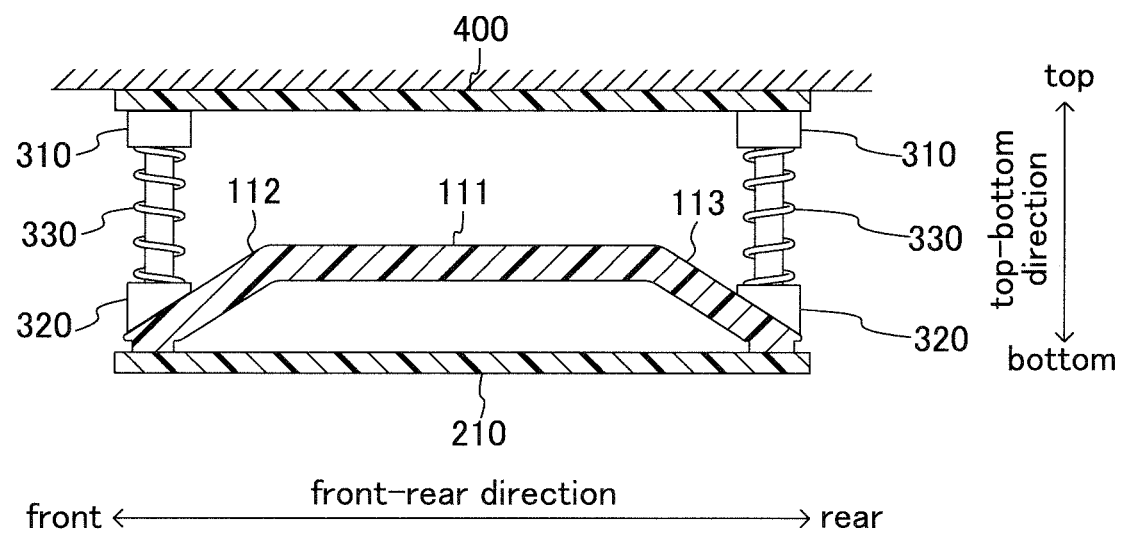
FIG. 6C Sectional view of the tubular member formed by welding together the first member and the second member of FIG. 4 taken perpendicularly to the longitudinal direction.

Next, as shown in FIG. 6A, first, laser beams L are individually applied to the front surface and the rear surface of the protrusion 121 and are scanned in the left-right direction (a direction perpendicular to the paper on which FIG. 6A is depicted). For example, the laser beam L is scanned from the right end to the left end of the protrusion 121. As a result, a portion of the top surface 121a of the protrusion 121 in the vicinity of the spot positions of the laser beams L melts, and a surface of the second member 200 in contact with the melted top surface 121a of the protrusion 121 melts. In this manner, a front end portion of the first member 100 and a front end portion of the second member 200 are welded together. Next, as shown in FIG. 6B, the laser beams L are individually applied to the front surface and the rear surface of the protrusion 122 and scanned in the left-right direction (a direction perpendicular to the paper on which FIG. 6B is depicted). For example, the laser beams L are scanned from the right end to the left end of the protrusion 122. As a result, a portion of the top surface 122a of the protrusion 122 in the vicinity of the spot positions of the laser beams L melts, and a surface of the second member 200 in contact with the melted top surface 122a of the protrusion 122 melts. In this manner, as shown in FIG. 6C, a rear end portion of the first member 100 and a rear end portion of the second member 200 are welded together. According to this method, since the laser beams L are individually applied to the opposite side surfaces of the protrusion 121 and the opposite side surfaces of the protrusion 122, the top surface 121a of the protrusion 121, the top surface 122a of the protrusion 122, a surface of the second member 200 in contact with the melted top surface 121a, and a surface of the second member 200 in contact with the melted top surface 122a can be melted reliably and speedily as compared with the case where the laser beam L is applied to merely one side surface of the protrusion 121 and one side surface of the protrusion 122. Therefore, the scanning speed of the laser beam L can be increased.

Figure 7:
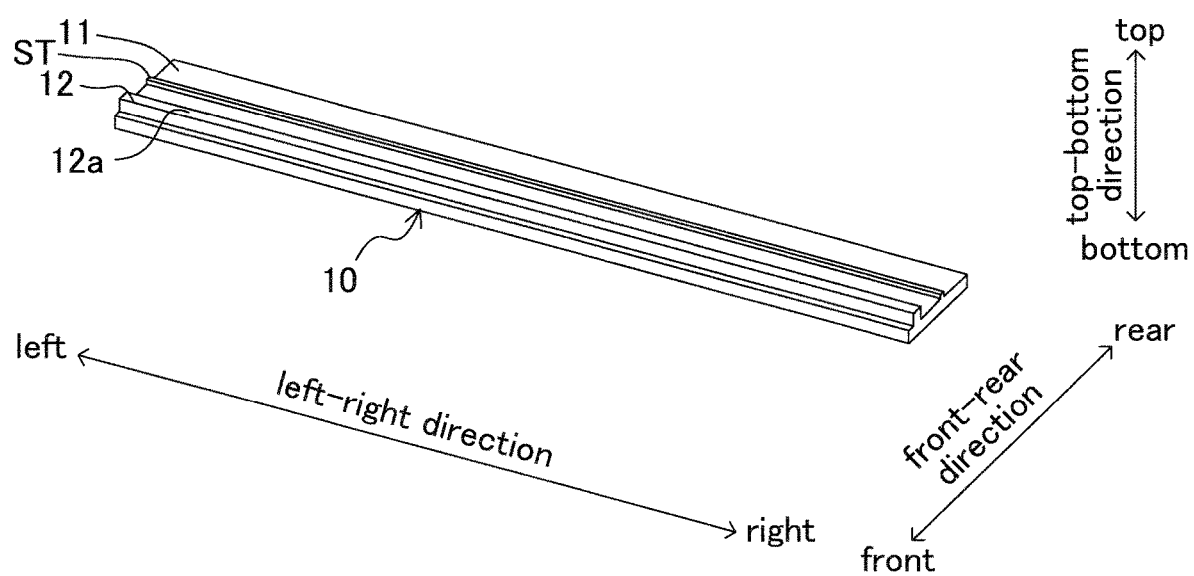
FIG. 7 Perspective view showing an example in which a stopper is provided on the first member of FIG. 1.
Figure 8:
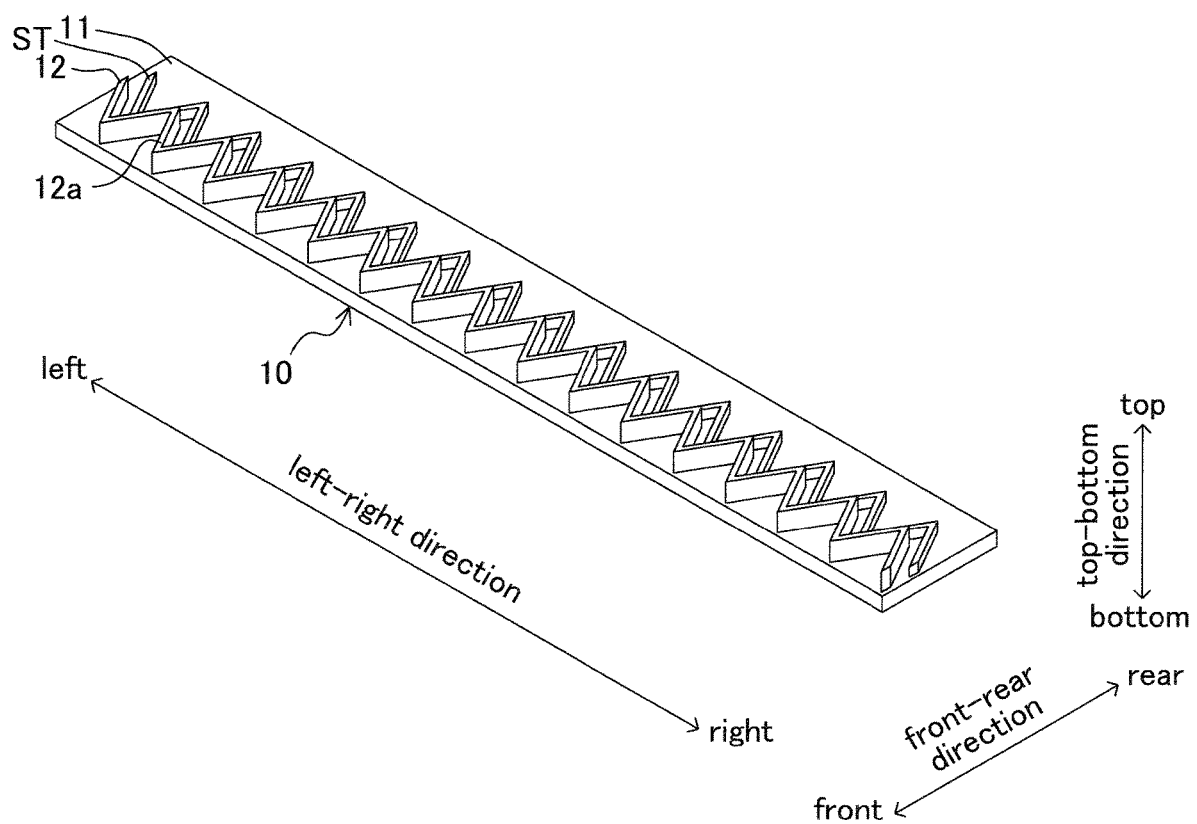
FIG. 8 Perspective view showing an example in which a stopper is provided on the first member of FIG. 3.

As shown in FIGS. 7 and 8, a stopper ST may be provided for fixing the amount of crush of the protrusion 12 (the size of the gap between the first member 10 and the second member 20 after welding). In the examples shown in the drawings, the stopper ST extends in parallel with the protrusion 12. The stopper ST is formed integrally with the body 11. The stopper ST is lower in protruding height than the protrusion 12. The laser beam L is applied merely on the protrusion 12 and is not applied to the stopper ST. Thus, when the protrusion 12 begins to be crushed by the pressing devices 30 as a result of melting of the protrusion 12, the lower surface of the second member 20 abuts against the upper surface of the stopper ST before the protrusion 12 is completely crushed. As a result, the protrusion 12 is not crushed further. By virtue of this, the amount of crash of the protrusion 12 (the size of the gap between the first member 10 and the second member 20 after welding) can be fixed. Notably, the stopper ST may be formed as an independent member different from the first member 10 by use of a material (material that does not melt upon irradiation with the laser beam L) different from that of the first member 10 and may be attached to the upper surface of the body 11. In this case, the stopper ST may be insert-molded to the body 11. Also, the stopper ST does not need to be formed in parallel with the protrusion 12, and may be composed of a plurality of segments provided at a plurality of positions located apart from the protrusion 12.

Figure 9:
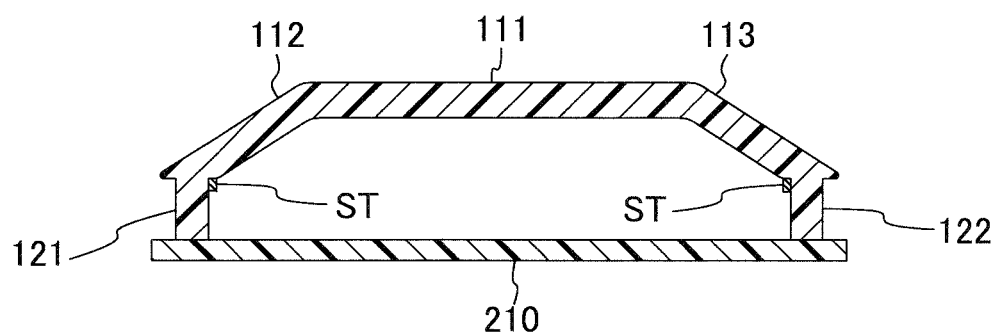
FIG. 9 Perspective view showing an example in which a stopper is provided on the first member of FIG. 4.

As shown in FIG. 9, in the case where a tubular component is formed by welding the first member 100 and the second member 200 together, the stopper ST may be provided on the first member 100 (or the second member 200). In forming the tubular component as shown in FIG. 9, the tubular component needs to have protrusions at respective opposite sides thereof, and the protrusions need to be melted through irradiation with a laser beam for welding the first member 100 and the second member 200 together. However, in the case of melting the protrusions one by one as shown in FIG. 6B, if only the protrusion on one side excessively melts, the opposite protrusions differ from each other in height. By means of the opposite protrusions of the first member 100 being provided with the stoppers ST, respectively, excessive melting of one protrusion only can be prevented. As a result, the tubular member easily has a fixed height at opposite sides. Further, in laser-welding the first member 100 and the second member 200 while pressure is applied to the first and second members 100 and 200 as shown in FIG. 6B, if the opposite protrusions differ in height, the protrusions receive different pressures in the course of laser irradiation; as a result, joining strength varies between opposite sides of the member. Since the structure of FIG. 9 can prevent the opposite protrusions of the member from having different heights, the above problem can be solved.

Figure 10:
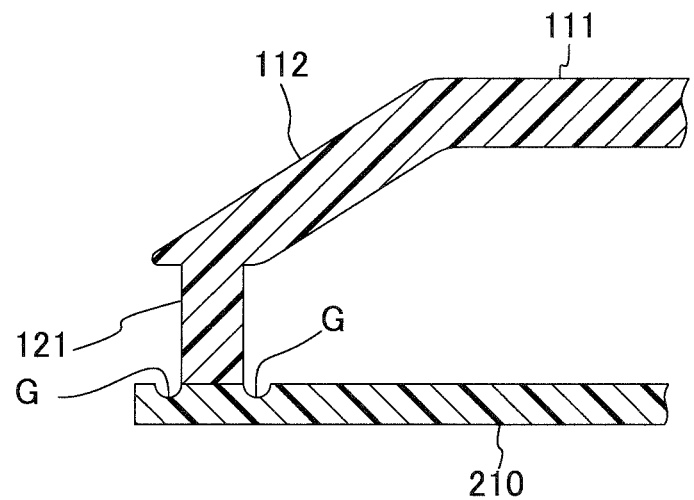
FIG. 10 Perspective view showing an example in which a stopper is provided on the second member of FIG. 4.

Also, for example, as shown in FIG. 10, two grooves G extending in the left-right direction (a direction perpendicular to the paper on which FIG. 10 is depicted) may be provided in the upper surface of the second member 200. In this case, the two grooves G are located apart from each other in the front-rear direction. The protrusion 121 is abutted against a plane portion between the front groove G and the rear groove G. In other words, the front groove G is formed along the front surface of the protrusion 121, and the rear groove G is formed along the rear surface of the protrusion 121. Although unillustrated in FIG. 10, the grooves G may also be formed on the front and rear sides, respectively, of the protrusion 122. In this case, when the protrusions 121 and 122 melt as a result of irradiation with the laser beam L, a portion of a melted synthetic resin material flows into the grooves G. By virtue of this, the melted synthetic resin material can be restrained from oozing outward from the front and rear ends of the first member 100 and the second member 200.

Figure 11:
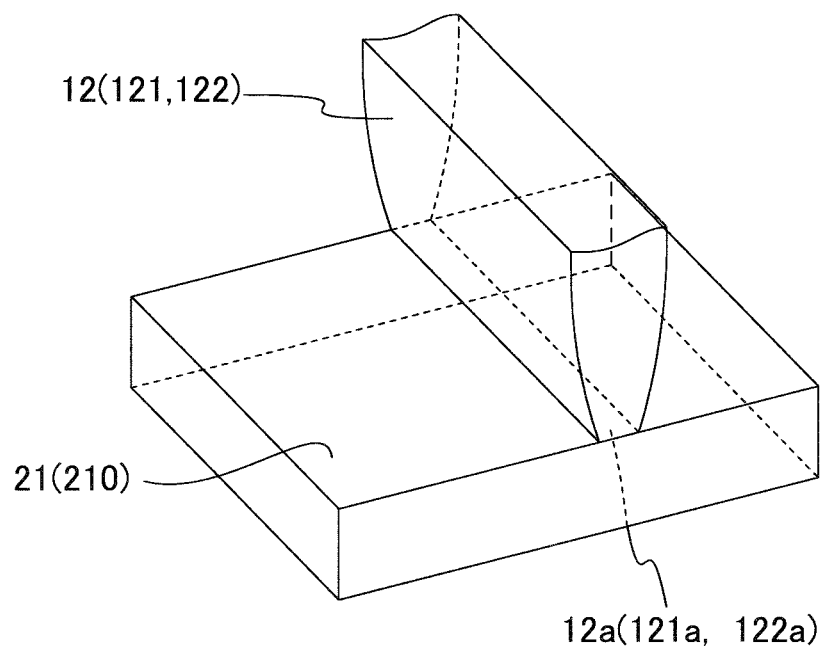
FIG. 11 Perspective view showing an example in which the distal end of a protrusion is smaller in width than the proximal end of the protrusion.

As shown in FIG. 11, the distal end side (top surface 12a (121a, 122a) side) of the protrusion 12 (121, 122) may be smaller in width (dimension in the front-rear direction) than the proximal end side (body 11 (front slope portion 112, rear slope portion 113) side). In this case, as shown in FIG. 11, the width of the protrusion 12 (121, 122) may reduce gradually from the proximal end side of the protrusion 12 (121, 122) toward the distal end side. By virtue of this, the distal end side (i.e., the top surface 12a (121a, 122a) side) of the protrusion 12 (121, 122) can be preferentially melted.

Figure 12:
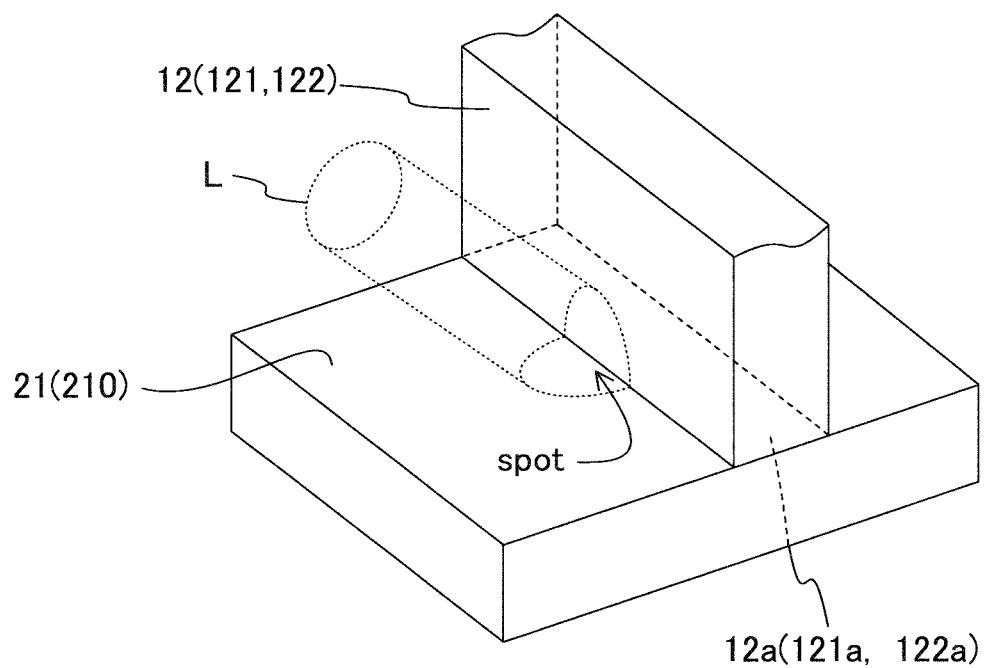
FIG. 12 Perspective view showing an example in which the spot of a laser beam is positioned on the boundary between a side surface of the protrusion and a surface of the second member.

As shown in FIG. 12, the laser beam L may be applied obliquely to a side surface of the protrusion 12 (protrusion 121, 122) such that the center of the spot of the laser beam L is positioned at the boundary between the side surface of the protrusion 12 (protrusion 121, 122) and the surface of the second member 20 (second member 200). Specifically, a portion of the spot may be positioned on the side surface of the protrusion 12 (protrusion 121, 122), and a portion of the spot may be positioned on the surface of the second member 20 (second member 200). By virtue of this, the laser beam L directly melts the side surface of the protrusion 12 (121, 122) and the surface of the second member 20 (second member 200), and heat of the melted surfaces is transmitted to the top surface 12a (121a, 122a) of the protrusion 12 (121, 122) and to a surface of the second member 20 (200) in contact with the protrusion 12 (121, 122) to thereby melt the top surface 12a (121a, 122a) and the contact surface.

Figure 13:
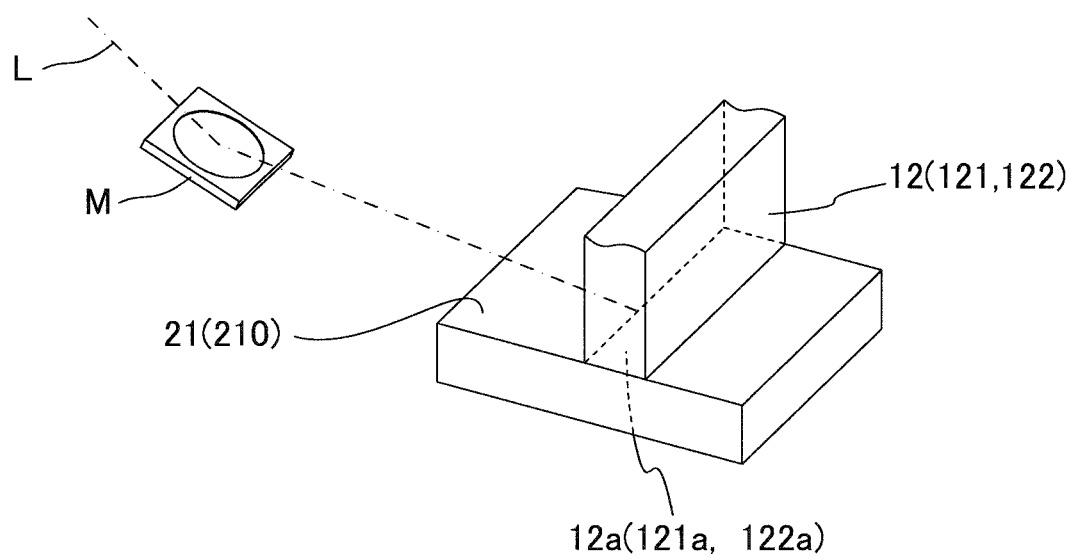
FIG. 13 Schematic view showing an example in which a mirror is provided for finely adjusting the angle of a laser beam in relation to a side surface of the protrusion.

Therefore, as compared with the case in which the laser beam L is applied to only the side surface of the protrusion 12 (121, 122), and heat is transmitted only from the side surface of the protrusion 12 (121, 122) to the top surface 12a (121a, 122a) of the protrusion 12 (121, 122) and to the contact surface, the top surface 12a (121a, 122a) of the protrusion 12 (121, 122) and the contact surface can be melted reliably and speedily. Notably, in this case, as shown in FIG. 13, by use of a mirror M for reflecting the laser beam L, the angle of application of the laser beam L to the side surface of the protrusion 12 (protrusion 121, 122) may be finely adjusted. In this case, similarly to the emitter of the laser apparatus 50, the mirror M may be moved by an unillustrated robot hand.

Also, while the protrusion 12 (protrusion 121, 122) is abutted against the second member 20 (second member 200), the first member 10 (first member 100) or the second member 20 (second member 200) may be vibrated. By virtue of this, the vibration mixes the synthetic resin materials of melted portions of the first member 10 (first member 100) and the second member 20 (second member 200). Subsequently, the mixed portions cool to solidify. Thus, the welding strength between the first member 10 (first member 100) and the second member 20 (second member 200) can be further enhanced.

The invention claimed is:

1. A synthetic resin member welding method for welding together a first member made of synthetic resin and a second member made of synthetic resin, the method comprising:
   providing a protrusion on the first member; and
   applying a laser beam to a side surface of the protrusion while a top surface of the protrusion of the first member is abutted against the second member to melt at least the entire top surface of the protrusion and melt a portion of the second member, the portion being in contact with the top surface, followed by solidification of the melted portions, whereby the first member and the second member are welded together, wherein
   the first member and the second member are the same synthetic resin material,
   the first member and the second member are not transparent to the laser beam, and
   a path of the laser beam does not intersect the second member at the melt portion of the second member.

2. The synthetic resin member welding method claim 1, wherein
   the protrusion extends in a predetermined direction, and
   a laser beam is applied to a side surface of the protrusion and is scanned in the predetermined direction for melting at least the entire top surface of the protrusion and melting the portion of the second member in contact with the top surface by heat of the melted top surface, followed by solidification of the melted portions, whereby the first member and the second member are welded together.

3. The synthetic resin member welding method according to claim 2, wherein
   laser beams are individually applied to opposite side surfaces of the protrusion and are scanned in the predetermined direction for melting at least the entire top surface of the protrusion and melting the portion of the second member in contact with the top surface by heat of the melted top surface, followed by solidification of the melted portions, whereby the first member and the second member are welded together.

4. The synthetic resin member welding method according to claim 2, wherein a groove extending along the protrusion is formed on the second member, so that at least a portion of melted synthetic resin material flows into the groove.

5. The synthetic resin member welding method according to claim 2, wherein
   the protrusion extends zigzag in relation to a predetermined rectilinear direction, and
   the laser beam is scanned along the predetermined rectilinear direction.

6. The synthetic resin member welding method according to claim 2, wherein
   a projecting portion extending in an extending direction of the protrusion is provided on the first member or the second member such that the projecting portion projects from a surface of the first member or the second member and the projecting portion is lower in protruding height than the protrusion, and
   of the protrusion and the projecting portion, only the protrusion is melted, whereas the projecting portion is not melted.

7. The synthetic resin member welding method according to claim 1, wherein a portion of a spot of the laser beam is positioned on a boundary between the first member and the second member.

8. The synthetic resin member welding method according to claim 1, wherein a distal end portion of the protrusion is smaller in width than a proximal end portion of the protrusion.

9. The synthetic resin member welding method according to claim 1, wherein the first member and the second member are formed of a carbon fiber reinforced plastic that contains carbon fibers, and the protrusion is formed integrally with a body of the first member.

* * * * *